Dec. 22, 1942.    J. SCHWARZ    2,305,815
DISCONNECTIBLE BALL JOINT
Filed Feb. 20, 1939
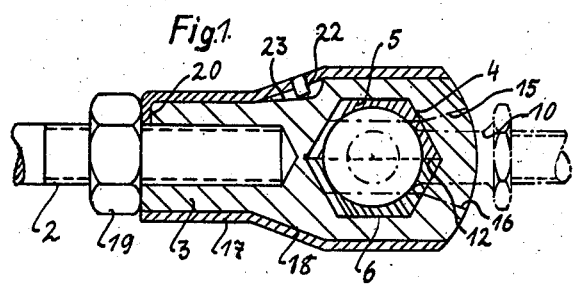
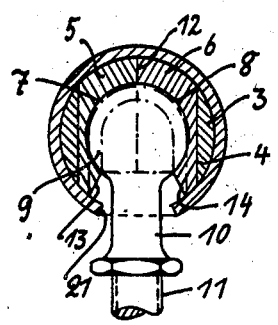
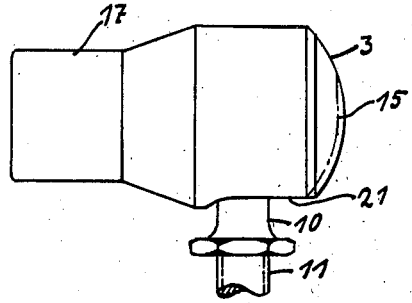
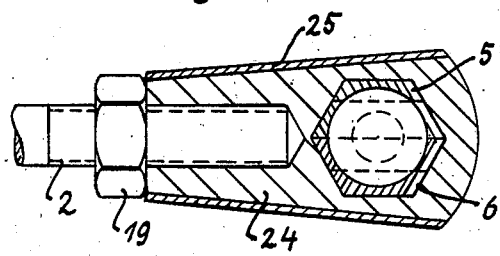
Inventor
Johannes Schwarz
By Bilinger. Atty.

Patented Dec. 22, 1942

2,305,815

UNITED STATES PATENT OFFICE 2,305,815

DISCONNECTIBLE BALL JOINT

Johannes Schwarz, Berlin-Dahlem, Germany; vested in the Alien Property Custodian Application February 20, 1939, Serial No. 257,534
In Germany February 21, 1938

4 Claims. (Cl. 287—90)

The invention relates to a disconnectible ball and socket joint with a sleeve pushed over the socket body holding the ball fast in the socket and allowing passage with play of the ball-shank, and the novelty consists in, that the pocket body contains bearings introduced laterally from the side into a cross-boring, which bearings are secured by the sleeve against movement and for their part enclose the ball in spherical recesses. This has the advantage that the ball is supported in the spherical seatings and the seatings for their part are supported in the cross-boring of the socket with little circumferential pressure, so that these parts are not quickly worn out in operation, and that the ball transmits its motion without play to the socket body and therefore to the coupling rod, as the bearings can, practically without play, lie against both the ball, and the socket body and the sleeve. The arrangement has for the further advantage, that the two bodies to be connected by the joint are guidable when forming between them not only at about a right angle but also if necessary at an obtuse angle, as the sleeve only needs to hold securely the bearings and the ball for its part is securely held directly only by the bearings, so that the ball shank also can be made rockable towards the front end of the bearing body beyond the end of the sleeve, as this and the bearings may contain corresponding passages for the ball shank. The angle of swing between the ball shank and bearing body axis or the two rods attached to these parts can therefore attain 90° in the new ball joint. If necessary this joint can also be constructed for connecting two adjacent rods working at an obtuse angle of approximately 180°, as the passages for the ball shank are disposed on the dividing line between the two bearings and in the bearing body are disposed only in the front side as a transverse slot passing through, whilst the sleeve may be provided with only a short slot for the passage of the ball shank to limit the play thereof. The sleeve should in this case be secured to the bearing body against rotation, for example by a grub screw.

An advantageous constructional form is provided if the cross boring of the bearing body has an angular cross section and the outer sides of the bearings are fitted to this. By this means the slot of the bearings for the passage of the ball shank is secured against rotation. The two bearings suitably provide a clearance for the ball shank larger in the direction of their said dividing line than transverse thereto, so that the ball shank has as large as possible a possibility of motion in the direction of its main swing and is fast held by the bearings against going too far.

With special advantage the bearings and if necessary also the socket body and the sleeve are made of artificial material, for example phenol resin or artificial materials provided with fibrous insertions and the spherical recess is suitably pressed into the bearings. By this means is produced a ball joint which is cheap and light and needs no lubrication.

The drawing illustrates the invention by way of example:

Fig. 1 a longitudinal section through a ball joint;

Fig. 2 a view at right angles thereto;

Fig. 3 a cross section thereof;

Fig. 4 a longitudinal section through a modified ball joint.

According to Fig. 1 a bearing body 3 of metal for example light metal such as aluminium or of artificial material for example phenol resin or other artificial resin with or without fibrous inserts is screwed on to a guide rod or a lever 2 and is provided at its free front end with a cross boring 4, which can be round, but is preferably angular, in the example hexagonal. The cross boring according to Fig. 3 pierces the whole bearing body and in it are introduced two bearings 5 and 6 fitting smoothly into the boring, which are each provided on their inner side with a substantially hemispherical recess 7 and 8 for the reception of the ball 9 of pin 10, to which a further guide rod is attached by the thread 11. The bearings 5 and 6 are provided on both sides of their dividing plane 12 with clearances 13 and 14 which extend further in the direction of the dividing plane 12 than transverse thereto, in order to permit of the passage of the pin 10 with sufficient play so that it can move with greater amplitude in the direction of the dividing plane than transverse thereto.

The clearances 13 and 14 may extend towards the free front surface of the bearing body 3 according to the dot and dash lines 15 and 16 in Fig. 1, and the bearing body 3 can be if necessary cut away according to lines 15 and 16 so that the pin 10 can be swung out to the position illustrated in dot and dash lines in Fig. 1. The transverse slots 15 and 16 can extend if necessary also transversely across the whole front surface of the bearing body 3 and over a corresponding part of the bearings 5 and 6 so that the joint is usable if necessary for knuckle bars. The lateral clearances 13 and 14 according to Fig. 3 can be reduced correspondingly according to necessity or can be omitted.

Over the bearing body 3 a sleeve 17 with a smooth seating is disposed, which lies against a shoulder 18 on the bearing body 3 and is retained in this position by a nut 19 of the rod 2. The sleeve 17 can be provided if necessary according to Fig. 1 with an inwardly projecting flange 20 which lies against the front end of the bearing body and is secured fast in position by the nut 19. The sleeve 17 is provided with a recess 21 over the extent of the clearances 13, 14 in order to allow passage of the ball shank 10. The sleeve 17 serves to hold immovably in the bearing body the bearings 5 and 6 introduced into the bearing body 3, and by this means also to fix the ball 9. If necessary the sleeve 17 can be secured against rotation relative to the bearing body 3 by a pin 22 secured in the sleeve, which pin engages in a recess 23 in the bearing body. This is necessary if the ball shank 10 is rockable as far as the end surface of the bearing body 3. The bearings 5 and 6 may consist, like the bearing body 3, of metal, for example aluminium, or of artificial resin and be pressed ready with the inclusion of the spherical recesses. The ball joint is then especially light and cheap and needs no lubrication.

According to Fig. 4 the bearing body 24 is formed outwardly as a cone of small angle at the apex and the sleeve 25 is fitted to this. A shoulder 18 according to Fig. 1 is by this means dispensed with, and the sleeve 25 can then be driven with a pressure seating on to the shell body 24 by the nut 19, so that the rigidity of a bearing body consisting of artificial resin is improved by the sleeve, which can be suitably made of metal. For the rest, the constructional form according to Fig. 4 corresponds to that according to Figs. 1–3.

In the constructional form according to Figs. 1–3 if necessary also the sleeve 17 can consist of artificial resin with fibrous insertion.

The ball joint is appropriate especially for joining control rods to control levers in motors, for example, motors for flying machines or motors for motor cars, furthermore also, for the attachment of steering rods to the axle rods of motor car wheels, for flying machine steering gear and similar objects.

I claim:

1. A disconnectible ball joint for steering arms and the like comprising in combination a solid bearing body adapted to be connected to a steering arm and being provided with a transverse cross boring, bearings introduced laterally into said cross boring and fitting closely to it, a ball provided with a shank, said ball being enclosed by said bearings by means of spherical recesses of the bearings, and a sleeve being lengthwise slidably disposed over said bearing body and secured to it and being disconnectible from said bearing body without disconnecting of said steering arm and securing said bearings against transverse movement by enclosing said bearing body and front ends of said bearings without play, said bearings and sleeve enabling the reciprocation of said ball shank, said boring permitting of the transverse withdrawing of said bearings and ball in the direction of said shank of said ball when said sleeve is withdrawn.

2. A ball joint according to claim 1 wherein the cross boring is provided with an angular cross section, to which the outer sides of the bearings are fitted.

3. A ball joint according to claim 1 wherein the two bearings are provided in the direction of their dividing plane with a clearance for the passage of the ball shank larger in that direction than transverse thereto.

4. A ball joint according to claim 1 wherein the bearing body and the sleeve are constructed as conical bodies of small angle at the apex.

JOHANNES SCHWARZ.